INVENTORS
Joseph R. Stormer
BY John C. Jacobs

Their Attorney

April 3, 1962   J. R. STORMER ETAL   3,027,600
PREFORMED GAS CONTAINING PLASTIC CELL AND METHOD OF MANUFACTURE
Filed Aug. 5, 1960   3 Sheets-Sheet 2

INVENTORS
Joseph R. Stormer
BY John C. Jacobs
Their Attorney

INVENTORS
Joseph R. Stormer
John C. Jacobs
BY
Their Attorney

United States Patent Office 3,027,600
Patented Apr. 3, 1962

3,027,600
PREFORMED GAS CONTAINING PLASTIC CELL
AND METHOD OF MANUFACTURE
Joseph R. Stormer, Trotwood, and John C. Jacobs, Dayton, Ohio, assignors to General Motors Corporation, Detroit, Mich., a corporation of Delaware
Filed Aug. 5, 1960, Ser. No. 47,641
11 Claims. (Cl. 18—56)

This invention relates to hydraulic shock absorbers, particularly of the direct acting type that have a piston reciprocable in a cylinder to displace fluid against flow resistance means in the shock absorber to absorb or dampen road shocks thereby.

In a conventional direct acting type hydraulic shock absorber, a piston is reciprocable in a cylinder, the piston being carried on the end of a reciprocating rod that extends from one end of the shock absorber cylinder, the rod being connected to one part of a movable mass, such as the chassis of a motor vehicle. The cylinder in which the piston reciprocates is positioned within a second and larger cylinder so that the space between the two cylinders provides a reservoir for hydraulic fluid that is displaced from the cylinder containing the piston. The reservoir cylinder is usually connected to another movable mass, such as the running gear of a motor vehicle.

The reservoir of the shock absorber serves two purposes, one of which is to provide a supply of hydraulic fluid to the shock absorber cylinder to make up for any loss of fluid that seeps to the outside of the shock absorber. The other function is that of providing a space into which hydraulic fluid can be displaced from the shock absorber cylinder during reciprocating motion of the piston within the shock absorber cylinder during one direction of movement of the piston in the cylinder and to replenish fluid into the shock absorber cylinder when the piston moves in an opposite direction.

In the conventional direct acting type shock absorber, a volume of fluid equal to the displacement of the rod on which the piston is mounted is displaced from the shock absorber cylinder through suitable resistance valves in the piston and in the base of the cylinder into the reservoir during the compression stroke on the shock absorber. On the rebound stroke, the volume of fluid that was displaced from the shock absorber cylinder during the compression stroke is returned to the shock absorber cylinder through a low resistance valve in the base of the cylinder to refill the cylinder. To provide space for the pulsing action of the hydraulic fluid between the shock absorber cylinder and the reservoir chamber, the reservoir has not been filled completely with hydraulic fluid, but rather a part of the volume of the reservoir forms an air chamber so that the reservoir level can vary with the displacement flow of the hydraulic fluid from the shock absorber cylinder. The pulsing flow of hydraulic fluid between the shock absorber cylinder and the reservoir causes a high degree of turbulence of the hydraulic fluid with the result the fluid picks up air in the reservoir and becomes aerated to such an extent that disturbing lag in the liquid flow through the resistance valving is produced at the instant of reversal of movement of the shock absorber piston.

To reduce the aeration effect in the hydraulic fluid, it has been proposed to place deformable gas chambers or cells within the reservoir chamber of the shock absorber to isolate air or gas in the reservoir chamber from the hydraulic fluid. The deformable gas chambers or cells may be formed of film-forming plastic materials that are impervious to air or the gas retained within the cell. The gas cell can be formed of two sheets of the film-forming plastic material that have their edges sealed together to form a gas chamber between the two sheets or walls of the so-formed cell, a predetermined volume of gas being placed within the cell so that under normal displacement flow of hydraulic fluid between the reservoir and the shock absorber cylinder, the gas cell will not collapse completely, and will therefore retain the reservoir chamber exterior of the cell in a state of hydraulic fill so that air cannot be drawn into the reservoir of the shock absorber. Such an arrangement of a gas containing cell in the reservoir of a shock absorber is more fully disclosed and described in the copending application of Charles S. Stultz, S.N. 794,111, filed February 18, 1959, now Patent No. 2,997,291 assigned to common assignee with this application.

Since the reservoir chamber of a direct acting shock absorber is cylindrical in peripheral contour, it is therefore an object of this invention to provide a method for manufacture of a deformable gas chamber or cell from film-forming plastic materials using the plastic films in flat sheet form from which the cell will be made in a generally flat arrangement and then preformed into a generally circular or cylindrical arrangement to provide for ease of insertion of the gas containing cell into the cylindrical contour of the reservoir chamber space.

It is another object of the invention to provide a method of manufacturing deformable gas chambers or cells having a generally cylindrical form by using flat plastic sheet films that are impervious to the gas to be retained in the cell, the gas cell being constructed of two sheets of the plastic film material positioned one upon the other with the peripheral edges of the sheets of plastic material sealed together to form a gas receiving or gas containing chamber. During the manufacture of the gas containing cell structure, a predetermined volume of a selected gas is inserted into the gas containing cell, the cell having a generally flat arrangement when filled with the predetermined volume of gas. Thereafter, the inflated gas cell is treated in a manner to form it into a generally cylindrical arrangement with one film-forming wall being the outside wall of the cylindrical arrangement of the cell and the other wall being an inner wall, the outer wall being arranged cylindrically in contour but with the inner wall having longitudinally extending creases or recesses with intermediate portions of the inner wall bulging radially inwardly of the generally cylindrical arrangement of the cell to form gas retaining pockets disposed peripherally around the cylindrical arrangement of the cell.

It is another object of the invention to provide a method of producing a deformable gas chamber or cell from flat sheet-like plastic films in accordance with the foregoing object wherein the physical characteristics of the films forming the walls of the gas cell have their characteristics changed during the preforming operation of the cell to place it into a generally cylindrical arrangement that the films will retain the generally cylindrical arrangement of the cell, and provide for ease of insertion of the cell into a cylindrical reservoir space in a shock absorber.

Further objects and advantages of the present invention will be apparent from the following description, reference being had to the accompanying drawings wherein a preferred embodiment of the present invention is clearly shown.

Figures 1, 2:
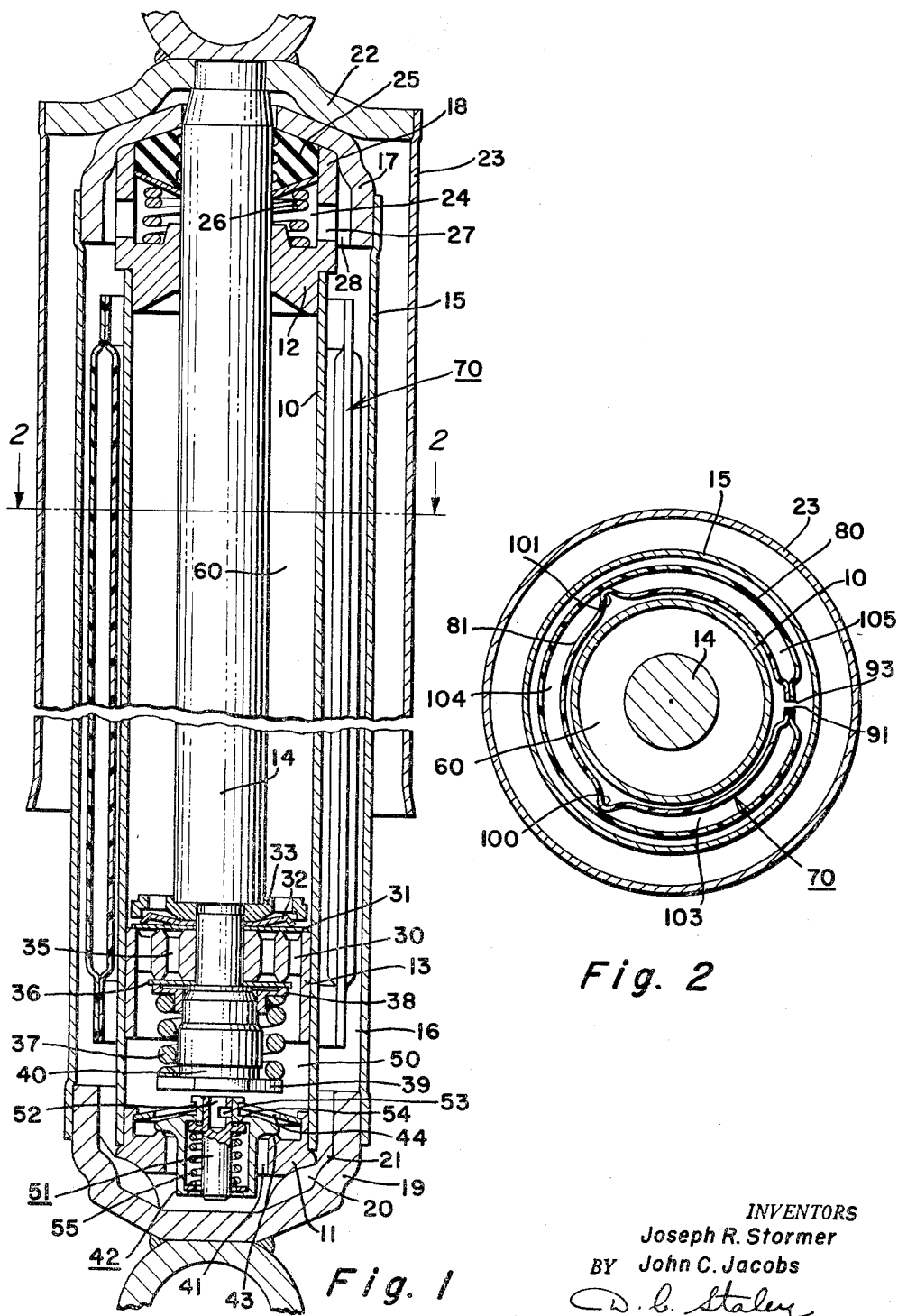
FIG. 1 is a cross-sectional view of a shock absorber having a gas containing cell incorporating features of this invention disposed in the reservoir chamber of the shock absorber.
FIG. 2 is a cross-sectional view taken along line 2—2 of FIG. 1.

In FIGS. 1 and 2 of the drawings, there is shown a shock absorber containing a gas cell constructed in accordance with this invention.

The shock absorber consists of a cylinder 10 closed at one end thereof by a closure member 11 and at the opposite end by means of a rod guide member 12. The cylinder 10 receives the piston 13 carried on the end of the rod 14 that extends from the end of the shock absorber through the rod guide member 12.

A cylindrical tube 15 surrounds the cylinder 10 with the space 16 forming a reservoir for hydraulic fluid. The upper end of the tube 15 has secured thereto an end cap 17 against which the upper end 18 of the rod guide 12 rests. The opposite end of the tube 15 has an end cap 19 closing the lower end of the tube 15 on which the closure member 11 of the shock absorber cylinder 10 rests, a plurality of ribs 20 being provided on the inner side of the cap 19 to position the member 11 in spaced relationship to the end cap 19 and provide passages 21.

The rod 14 extends through the end cap 17 and carries a member 22 that, in turn, supports a stone shield 23.

The rod guide 12 has a chamber 24 receiving a resilient rod seal member 25 held under compression by means of the compression spring 26. The seal chamber 24 is connected with the reservoir chamber 16 through the opening 27 in the rod guide 12 and one or more passages 28 between the end cap 17 and the rod guide 12.

The upper end of the rod 14 is connected with the chassis of a vehicle while the end cap 19 carries a suitable fitting for attachment to the running gear.

Piston 13 has an annular arrangement of axially extending passages 30 extending through the piston that are closed at their upper ends by means of a disk valve 31 held on seats provided around each of the passages by means of a spring 32, a retainer disk 33 controlling the maximum degree of flexure of the valve member 31. Piston 13 has a second series of annularly arranged passages 35 that extend through the piston which are closed by a disk valve 36 held on seats around the passages 35 by means of the compression spring 37 disposed between the retainer 38 and the head 39 of a retaining nut 40 by which the piston and valve assembly are held in assembled relationship.

The closure member 11 at the lower end of the cylinder 10 has a central opening 41 that receives the valve member 42 held on an annular seat 43 by means of a finger spring 44. The spring 44 is very light and has little resistance to upward opening of the valve 42 from its seat 43 whereby to provide for relatively free flow of hydraulic fluid from the reservoir chamber 16 into the chamber 50 between the piston 13 and the valve 42.

The valve 42 carries a resistance valve 51 that has an axial passage 52 connected with the radial passage 53 in the reduced diameter end thereof, the valve 51 being held on the seat 54 by the compression spring 55. The resistance valve 51 is retained on its seat by a pressure somewhat greater than the pressure required in the chamber 50 to open valve 31 to insure positive flow of hydraulic fluid from chamber 50 into chamber 60 during the compression stroke of the shock absorber.

In the normal operation of the shock absorber thus far described, movement of piston 13 downwardly toward the base valve 42 in the compression stroke causes hydraulic fluid to be displaced from the chamber 50 into the chamber 60 through valve 31, resistance valve 51 opening only after pressure in chamber 50 exceeds the opening pressure of valve 31. Valve 51 will open to provide for displacement of hydraulic fluid from chamber 50 into the reservoir chamber 16 because of the entry of rod 14 into chamber 60, the volume of fluid displaced from chamber 50 being equal to the volume of the rod 14 entering the chamber 60. This displacement of fluid through valve 51 and restrictive flow through valve 31 controls the compression stroke of the shock absorber.

On the rebound stroke, that is an upward movement of piston 13, hydraulic fluid will be displaced from chamber 60 into chamber 50. However, the volume of fluid thus displaced through valve 36 will be insufficient to fill the total volume of chamber 50. "Make up" of hydraulic fluid will be received from the reservoir chamber 16 through passage 21, which flow of hydraulic fluid opens valve 42 against substantially no resistance and allows relatively free flow of the hydraulic fluid from the reservoir chamber into chamber 50.

In the normal shock absorber, since there is the displacement of hydraulic fluid aforementioned, it is necessary for an air space to be provided in the reservoir chamber 16. The constant pulsing of the displaced fluid into and out of the reservoir chamber creates high turbulence of the hydraulic fluid in the reservoir chamber resulting in absorption of air into the hydraulic fluid, thereby aerating the hydraulic fluid. Since resistance to flow through the valved passages of the shock absorber is different for aerated hydraulic liquid than for a solid body of liquid, the damping effect of the shock absorber using an aerated hydraulic fluid is quite different from the damping effect of a shock absorber using a solid body of fluid.

Also, some of the air in the hydraulic fluid becomes separated from the oil in the cylinder, particularly at the instant of release of pressure on the hydraulic fluid on reversal of stroke, resulting in free air in the cylinder which produces a lag in the control effect of the oil passing through the several resistance valves.

To eliminate the aeration of the hydraulic fluid, a deformable chamber or cell 70 is placed within the reservoir chamber 16. This cell 70 is a closed or sealed cell containing a predetermined volume of a selected gas. The volume of the selected gas in the sealed cell 70 is such that under conditions of full collapse of the shock absorber (full compression stroke) at the highest temperature expected in normal operation, the cell 70 will not be fully collapsed, thus there will always be a gas volume in the reservoir chamber 16 to accommodate liquid displaced from the shock absorber cylinder 10.

The gas volume in the cell 70 is also such that when the shock absorber is fully extended at the lowest temperature at which it normally operates, the expansion of the gas in the cell 70 will still maintain some pressure on the hydraulic fluid to insure filling of all voids in the shock absorber.

Thus, with the gas in the reservoir chamber 16 completely isolated from the hydraulic fluid, there will be no absorption of the gas into the hydraulic fluid and aeration of the hydraulic fluid is eliminated.

Figure 8:
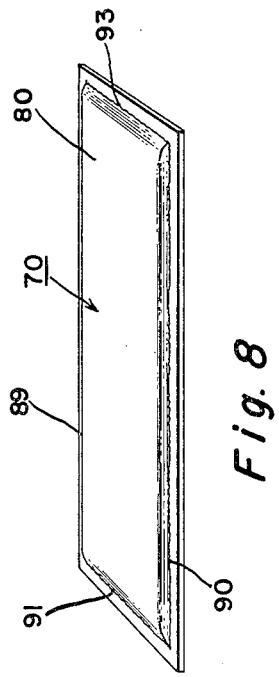
FIG. 8 is a perspective elevational view of a flat gas containing cell prior to a subsequent preforming operation which places it into the configuration of the cell shown in FIG. 3.
Figure 7:
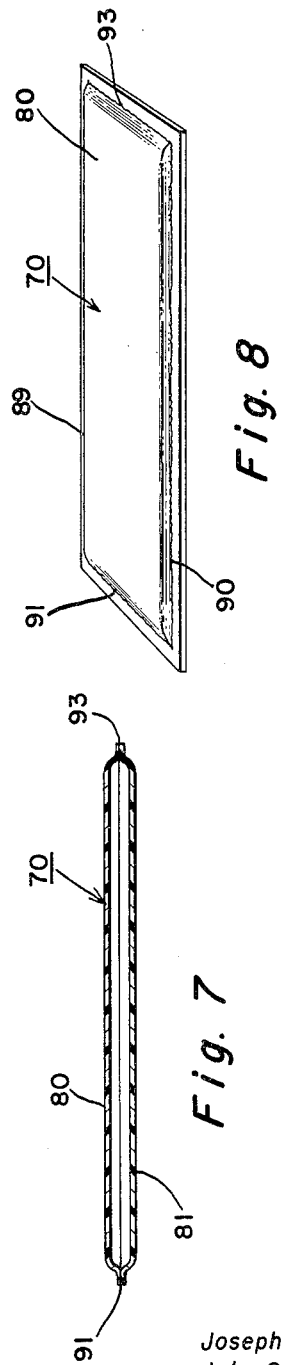
FIG. 7 is a cross-sectional view of a flat gas containing cell as formed on the apparatus shown in FIGS. 5 and 6.

The gas cell 70 is constructed of a nylon sheet film, a superpolyamide plastic, having a thickness of from 2 to 4 mills. The cell 70 is formed by placing two substantially rectangular sheets of nylon sheet film in superimposed relationship one on the other, that is face-to-face, and sealing all four edges of the film. This forms a flat double walled gas chamber as shown in FIGS. 7 and 8. A suitable gas, such as "Freon 13" (trifluoromonochloromethane), to which the nylon film is impermeable is charged into the gas cell in predetermined volume of 60 cc. to 70 cc. The charge of gas is sufficient to dispose opposite walls of the gas cell in spaced relationship when the cell is at room temperature and under atmospheric pressure, the internal gas pressure in the cell just balancing atmospheric pressure. Also, the volume of gas charged into the cell is sufficient to prevent complete collapse of the gas cell when the shock absorber is fully compressed at a temperature of from −35° F. to −40° F. This is to insure maintenance of a pressure on the hydraulic fluid under the lowest operating temperatures at which the shock absorber is expected to perform satisfactorily, the gas remaining in a gaseous state at all times.

In the preferred form of the invention, the plastic film forming the walls of the gas cell 70 is a commercial nylon (superpolyamide) film known as "nylon #6" that is made by several different companies. Also, the commercial material known as "nylon #42" is satisfactory for use in forming the gas cell 70 as well as other film forming polyamides. The non-polar "Freon" compositions, such as Freon 13 (trifluoromonochloromethane—boiling point −114.7° F.) and Freon 14 (tetrafluoromonochloromethane—boiling point −198.4° F.) are satisfactory for use as the selected gas for charging the gas cell 70. Both of these Freon compositions have satisfactory low boiling points of below −40° F. that they will remain gaseous under all conditions of normal operation of the shock absorber.

Figure 3:
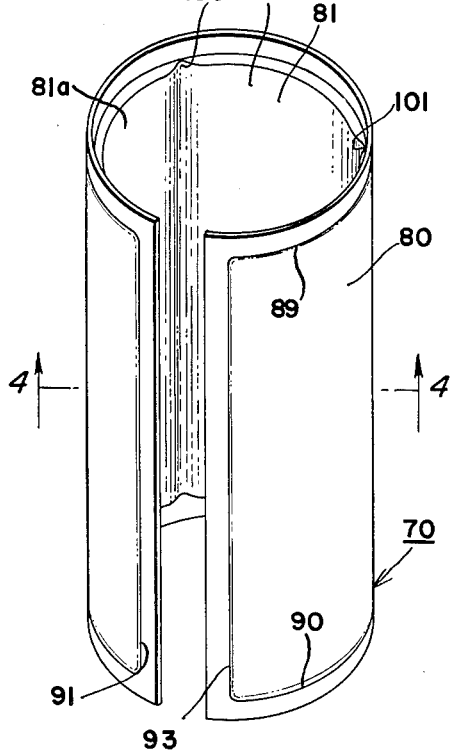
FIG. 3 is a perspective elevational view of a gas containing cell incorporating features of this invention shown in its preformed condition.
Figure 4:
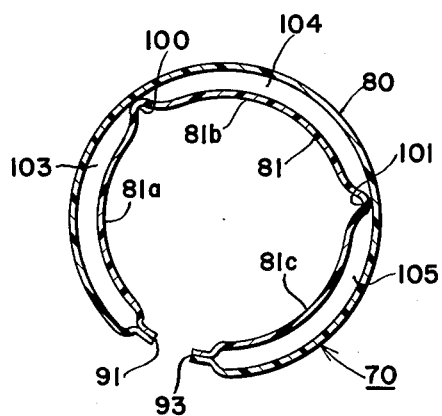
FIG. 4 is a transverse cross-sectional view taken along line 4—4 of FIG. 3.

The gas cell 70, as shown as incorporated in the shock absorber as in FIG. 2, has been preformed from the generally flat configuration shown in FIGS. 7 and 8 to the generally cylindrical configuration shown in FIGS. 3 and 4 before insertion into the reservoir chamber 16 of the shock absorber during assembly of the shock absorber. It is quite difficult for an assembly operator to hold an inflated generally flat cell, such as that shown in FIGS. 7 and 8, in a sufficiently circular form that it can be easily and readily inserted into the cylindrical form of the reservoir chamber 16 of the shock absorber. To alleviate the difficulty of assembly of a generally flat inflated cell made of flat sheet material, it is the purpose of this invention to preform the inflated cell 70 from the generally flat arrangement shown in FIGS. 7 and 8 to the generally cylindrical configuration shown in FIGS. 3 and 4 before the assembly operation so that the assembly operator can more easily and quickly insert the cell 70 into the reservoir chamber 16 of the shock absorber.

Figure 6:
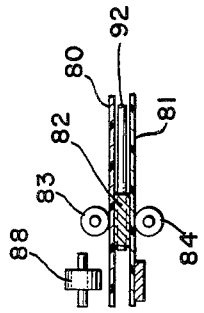
FIG. 6 is a cross-sectional view taken along line 6—6 of FIG. 5.
Figure 5:
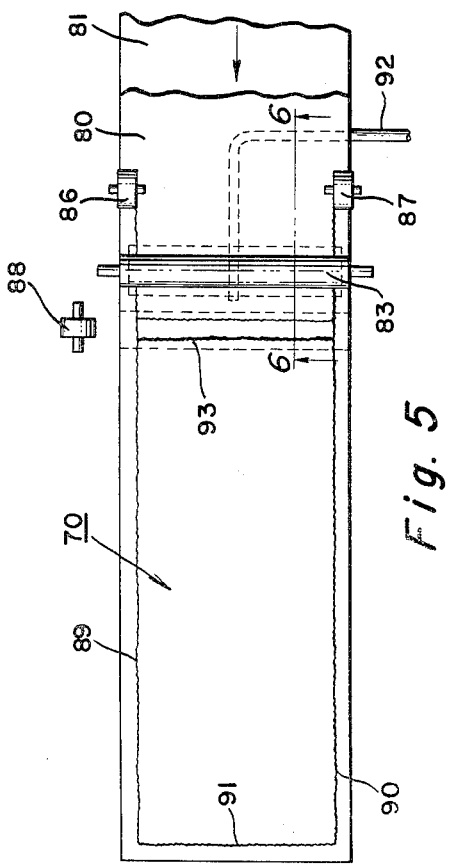
FIG. 5 is a schematic elevational view of apparatus capable of forming a flat gas containing cell from sheet-like plastic films.

The plastic cell 70 consists of two flat commercial sheets of nylon film 80 and 81 that are placed one upon the other, as shown in FIGS. 5 and 6. These sheets or films 80 and 81 pass over a spacer bar 82 and are held in engagement with the spacer bar by rollers 83 and 84. As the films 80 and 81 move in a left-hand direction, as viewed in FIG. 5, heat sealing devices 86 and 87 engage longitudinally extending coextensive edges of the films 81 and 80 to seal the edges together. A heat sealing device 88 is adapted to traverse the films in a transverse direction to form a transversely extending seal or seam between the longitudinally extending edges so that the sealed edges 89 and 90 and the transversely sealed seam 91 form an enclosure extending from the left-hand side of the spacer bar 82, forming a bag that is open at one end. A suitable conduit 92 supplies a suitable gas, such as Freon 13, into the interior of the open ended bag or cell 70 to supply a predetermined volume of gas into the cell, after which the heat sealing device 88 is caused to traverse superimposed films 80 and 81 to effect a transverse seal 93 and thereby close the previously open end of the bag or cell 70. The so formed and sealed cell 70 is then cut from the films 80 and 81 to form the inflated cell 70 as shown in FIGS. 7 and 8.

Obviously in the inflated condition of the cell 70, both cell walls 80 and 81 are of identical size and configuration, considerable difficulty will be occasioned in endeavoring to manually manipulate the flat inflated cell into a generally cylindrical form to effect insertion of the cell into a narrow cylindrical reservoir chamber 16 of shock absorber, as shown in FIGS. 1 and 2.

It is therefore the purpose of this invention to effect a forming operation on the generally flat cell 70, as shown in FIGS. 7 and 8, to effect a change in its contour to one such as that shown in FIGS. 3 and 4. Since both of the cell walls 80 and 81 are of exactly the same length and are retained in spaced relationship by the inflating gas placed within the cell, one of the walls of the cell will be required to form on a smaller radius than the other of the walls when the cell wall that forms the outer wall of the cylindrically arranged cell as shown in FIG. 3 is in the form of a cylinder.

As shown more particularly in FIGS. 3 and 4, the wall 80 of the cell 70 is illustrated as an outer wall of the cylindrical arrangement of the cell while the wall 81 is illustrated as an inner wall. Since the inner wall 81 must conform to a radius of smaller diameter than the wall 80, because of the gas inflation of the cell, the wall 81 will have creases or recesses 100 and 101 formed in the wall 81 so that the wall portions 81a, 81b, and 81c can conform to the smaller radius. The creases or recesses 100 and 101 extend toward the outer wall 80 so that the wall portions between the creases, and the end edges 91 and 93 of the cell form gas pockets 103, 104 and 105 that are loosely interconnected at the recessed or creased portions 100 and 101, since the inner wall 81 is not bonded to the outer wall 80 at the recessed or creased portions 100 and 101.

Figure 9:
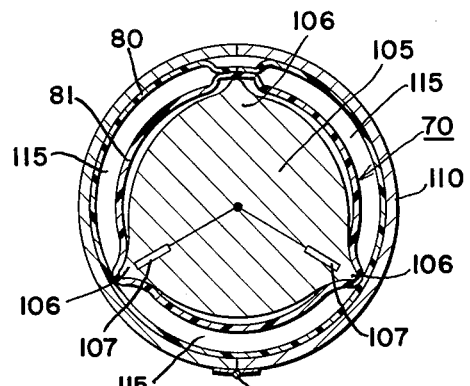
FIG. 9 is a cross-sectional view showing apparatus capable of preforming the flat gas cell of FIG. 8 into a configuration such as that shown in FIG. 3.

To control the formed configuration of the cell 70, as shown in FIGS. 3 and 4, the generally flat cell 70 shown in FIGS. 7 and 8, is wrapped around a mandrel 105, as shown in FIG. 9. The mandrel 105 is of general triangular shape in transverse cross section having the three legs 106 spaced 120° apart. A heating element is placed in the mandrel, either centrally thereof or separate heating elements may be placed in two of the three legs 106, as shown in FIG. 9, the heating elements being in the form of strip heaters 107, or any other suitable form of electrical heating device. A two-part casing member 110 hinged at 111 is adapted to close around the mandrel 105 after the inflated cell 70 has been placed around the mandrel by any suitable means, either manually or by automatic processing machinery.

The casing 110 confines the cell 70 so that the outer wall 80 of the cell takes on the configuration of a cylinder. Obviously, because of the inflated condition of the cell 70, the inner wall 81 cannot follow the same contour as the outer wall 80 because it is of the same length as the wall 80 and is spaced from the wall by a gas contained within the cell.

The inner wall 81 of the cell 70 therefore takes on a contour that extends radially inwardly of the outer wall 80, that is toward the axis of the cylinder formed by the outer wall 80, so that the bulbous portions 115 are formed, thereby forming gas pockets spaced peripherally around the cell 70.

The mandrel 105 is heated by the heaters 107 to a temperature sufficient to change the characteristics of the sheet forming films of the walls 80 and 81 so that when the cell 70 is removed from the mandrel, the walls of the cell retain their formed configuration, as more particularly illustrated in FIG. 4. Because nylon films are somewhat sensitive to exposure to high temperatures for a period of time, they take on a permanent change in properties due to oxidation, one of the effects in change in properties being an increased rigidity of the portion of the nylon film that has been exposed to high temperatures in the atmosphere. The degree of permanent change in properties depends upon the temperature level to which the nylon film was exposed and the time of the exposure, as well as the specific composition of the nylon itself. This characteristic of the nylon is taken advantage of in this invention by heating the nylon films forming the walls 80 and 81 of the cell 70 to a sufficiently high temperature, at least in the areas engaging the extremities of the mandrel 105 where they bend over the portions 106 of the mandrel that these portions of the film have their physical properties changed sufficiently to give just enough rigidity to the entire cell 70 that it will retain the generally cylindrical form shown in FIGS. 3 and 4 when the cell is removed from the mandrel.

It has been found that if the mandrel is heated to a temperature of from 180° F. to 200° F. and the inflated cell 70 is held in the position shown in FIG. 9 on the mandrel 105 for a period of approximately ten seconds that the physical properties of the nylon film are changed sufficiently that when the nylon cell 70 is removed from the mandrel, it will retain the cylindrical configuration shown in FIGS. 3 and 4, the portions of the film in the area engaged by the end portions 106 of the mandrel being considerably stiffer or more rigid than the remaining portions of the film forming the walls of the cell.

Figure 10:
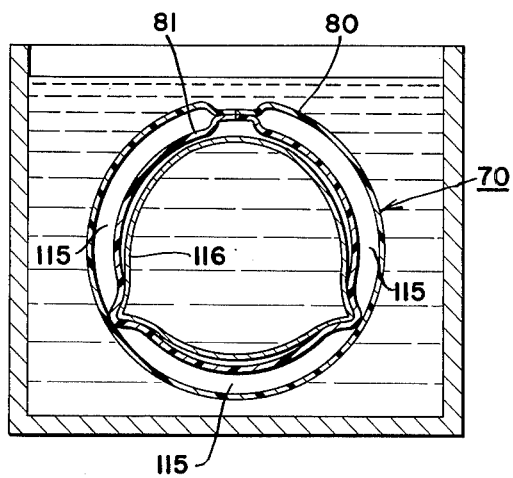
FIG. 10 illustrates a modified arrangement for preforming the flat gas cell shown in FIG. 8 to bring it into a configuration as shown in FIG. 3.

It has also been found that similar results can be obtained by placing the generally flat cell 70 around a hollow mandrel 116, as shown in FIG. 10, and immersing the assembly in a liquid bath heated to a temperature of approximately 200° F. for a period of approximately 10 seconds.

Obviously the degree of change in the physical characteristics of the films forming the walls 80 and 81 will vary according to the temperature to which the films have been elevated by their respectice heating devices as shown in FIGS. 9 and 10. Thus there will be no extremely sharp line of demarcation between the areas of the film that have the physical characteristics changed, but rather it will be a gradual change from the point of highest temperature of contact with the films to whatever lower temperature the film has been elevated during the heating process.

It will be apparent from the foregoing description that when the cell 70 is in the formed condition as shown in FIGS. 3 and 4, an assembly operator will have substantially no difficulty of inserting the cell into the narrow reservoir chamber 16 of the shock absorber.

While the embodiments of the present invention as herein disclosed constitute a preferred form, it is to be understood that other forms might be adopted.

What is claimed is as follows:

1. In a method of producing a shaped gas containing cell of a flexible gas retaining film, the steps of, producing a generally flat dual walled container of a flexible gas retaining film and containing a predetermined volume of gas inflating the container sufficiently to prevent complete collapse of opposite walls of the container into full surface engagement, arranging the container with one wall forming the outer wall of a dual walled generally cylindrically arranged structure with said one wall disposed in general cylindrical arrangement and the other of the walls of the dual walled structure forming the inner wall of the structure and having axially longitudinally extending creases therein extending toward said outer wall dividing the container peripherally into a plurality of interconnected gas pockets, and while the container is held in the aforementioned arrangement of causing the film to take a set to retain the said formed arrangement of the said walls.

2. In a method of producing a shaped gas containing cell of a flexible gas retaining film, the steps of, producing a generally flat dual walled container of a flexible gas retaining film and containing a predetermined volume of gas inflating the container sufficiently to prevent complete collapse of opposite walls of the container into full surface engagement, arranging the container with one wall forming the outer wall of a dual walled generally cylindrically arranged structure with said one wall disposed in general cylindrical arrangement and the other of the walls of the dual walled structure forming the inner wall of the structure and having axially longitudinally extending creases therein extending toward said outer wall dividing the container peripherally into a plurality of interconnected gas pockets, and while the container is held in the aforementioned arrangement of causing a change in the properties of at least a part of the film to cause it to take a set to retain thereby the said formed arrangement of the said walls.

3. In a method of producing a shaped gas containing cell of a flexible gas retaining film, the steps of, producing a generally flat dual walled container of a flexible gas retaining film and containing a predetermined volume of gas inflating the container sufficiently to prevent complete collapse of opposite walls of the container into full surface engagement, arranging the container with one wall forming the outer wall of a dual walled generally cylindrically arranged structure with said one wall disposed in general cylindrical arrangement and the other of the walls of the dual walled structure forming the inner wall of the structure and having axially longitudinally extending creases therein extending toward said outer wall dividing the container peripherally into a plurality of interconnected gas pockets, and while the container is held in the aforementioned arrangement of applying heat to the film of sufficient intensity to cause the film to take a set to retain thereby the said formed arrangement of the said walls.

4. In a method of producing a shaped gas containing cell of a flexible gas retaining film, the steps of, producing a generally flat dual walled container of a flexible gas retaining film and containing a predetermined volume of gas inflating the container sufficiently to prevent complete collapse of opposite walls of the container into full surface engagement, arranging the container with one wall forming the outer wall of a dual walled generally cylindrically arranged structure with said one wall disposed in general cylindrical arrangement and the other of the walls of the dual walled structure forming the inner wall of the structure and having axially longitudinally extending creases therein extending toward said outer wall dividing the container peripherally into a plurality of interconnected gas pockets, and while the container is held in the aforementioned arrangement of applying heat to the film by immersing the container in a heated liquid bath to cause the film to take a set and retain thereby the said formed arrangement of the said walls.

5. In a method of producing a shaped gas containing cell of a flexible gas retaining film, the steps of, producing a generally flat dual walled container of a flexible gas retaining film and containing a predetermined volume of gas inflating the container sufficiently to prevent complete collapse of opposite walls of the container into full surface engagement, arranging the container with one wall forming the outer wall of a dual walled generally cylindrically arranged structure with said one wall disposed in general cylindrical arrangement and the other of the walls of the dual walled structure forming the inner wall of the structure and having axially longitudinally extending creases therein extending toward said outer wall dividing the container peripherally into a plurality of interconnected gas pockets, and while the container is held in the aforementioned arrangement of applying heat to the film at least in the area of the said creases of sufficient intensity to cause the film at least in the area of the creases to become more rigid than the remaining portion of the film and take a set to retain thereby the said formed arrangement of the said walls.

6. In a method of producing a shaped gas containing cell of a flexible gas retaining plastic film, the steps of, producing a generally flat dual walled gas retaining container by assembling a pair of flat flexible gas retaining plastic films having a general quadrilateral configuration into juxtaposition one on the other and sealing together the peripheral edges of the films and inserting into the so formed container a predetermined volume of gas inflating the container sufficiently to prevent complete collapse of opposite dual walls of the container into full surface engagement, arranging the container with one wall forming the outer wall of a dual walled generally cylindrically arranged structure with said one wall disposed in general cylindrical arrangement and the other of the walls of the dual walled structure forming the inner wall of the structure and having axially longitudinally extending creases therein extending toward the said outer wall dividing the container peripherally into a plurality of loosely interconnected gas pockets, and while the container is held in the aforementioned arrangement of causing a change in the properties of the film forming the said inner wall by heating at least in area of the creases thereof cause the film in the so heated area to take a permanent set and retain thereby the said formed arrangement of the said walls.

7. The method set forth in claim 6 wherein the plastic film is a nylon thermoplastic polymer resin subject to permanent change in properties on heating due to oxidation to increase resistance to bending deformation of the so heated portion of the nylon film.

8. In a method of producing a shaped gas containing cell of a flexible gas retaining film, the steps of, producing a generally flat dual walled gas retaining container by assembling a pair of flat flexible gas retaining plastic films having a generally quadrilateral configuration into juxtaposition one on the other and sealing together the peripheral edges of the films and inserting into the so formed container a predetermined volume of gas inflating the container sufficiently to prevent complete collapse of opposite walls of the dual walled container into full surface engagement, arrranging the so formed container around a forming mandrel with one wall of the container forming the outer wall of a dual walled generally cylindrical arranged structure with said one wall disposed in general cylindrical arrangement and the other of the walls of the dual walled structure forming the inner wall of the structure and having the wall formed toward the said outer wall in axially longitudinally extending creases therein that extend toward said outer wall to form the container thereby into a plurality of peripherally extending loosely interconnected gas pockets, and heating the mandrel while the container is held thereon in the aforementioned arrangement to cause the portion of the film heated by the mandrel to take a set in the formed arrangement whereby to retain the dual walled cell in the formed arrangement when removed from the mandrel.

9. The method set forth in claim 8 wherein the mandrel is provided with a plurality of axially longitudinally extending edges over which the said generally flat dual walled container is arranged physically to effect thereby the cylindrical arrangement of the outer wall of the said container and the creased arrangement of the inner wall thereof.

10. The method set forth in claim 8 wherein the mandrel is heated to a temperature of from 180° F. to 200° F. with the container being held on the mandrel for a period on the order of ten seconds to effect the said setting of the plastic film thereby.

11. In a method of producing a shaped gas containing cell of a flexible gas retaining plastic film, the steps of producing a generally flat dual walled gas retaining container by assembling a pair of flat flexible gas retaining plastic films of similar peripheral size and shape having a general quadrilateral configuration into juxtaposition one on the other and sealing together the peripheral edges of the films and inserting into the so formed container a predetermined volume of gas inflating the container sufficiently to prevent complete collapse of opposite dual walls of the container into full surface engagement and provide a space therebetween arranging the so inflated container with one wall forming the outer wall of a dual walled generally cylindrically arranged structure with said one wall disposed on a radius providing for a general cylindrical arrangement of the said one wall and the other of the walls of the dual walled structure forming the inner wall of the structure and arranged on a radius smaller than that on which said outer wall is arranged due to the inflated condition of the cell and having thereby axially longitudinally extending creases therein extending toward the said outer wall dividing the container peripherally into a plurality of loosely interconnected inflated gas pockets, and while the container is held in the aforementioned arrangement of causing a change in the properties of the film forming the said inner wall by heating at least in area of the creases thereof to cause the film in the so heated area to take a permanent set and retain thereby the said formed arrangement of the said walls.

References Cited in the file of this patent

UNITED STATES PATENTS

| | | |
|---|---|---|
| 1,937,511 | Crane | Dec. 5, 1933 |
| 2,272,290 | Beal | Feb. 10, 1942 |
| 2,296,105 | Hansen | Sept. 15, 1942 |
| 2,315,576 | Auzin | Apr. 6, 1943 |
| 2,805,973 | Klasing et al. | Sept. 10, 1957 |
| 2,856,035 | Rohacs | Oct. 14, 1958 |
| 2,873,227 | Olson et al. | Feb. 10, 1959 |
| 2,894,742 | Peterson | July 14, 1959 |